United States Patent
Hall

(10) Patent No.: US 6,947,257 B2
(45) Date of Patent: Sep. 20, 2005

(54) SYSTEM AND METHOD OF INTRODUCING A PREFERENTIAL CURVATURE TO A FLEXIBLE MEDIUM FOR REDUCED MEDIUM VIBRATION AND SENSOR TO MEDIUM SPACING WITH A DISK DRIVE HEAD STACK ASSEMBLY HAVING A NON-ZERO STATIC ROLL ATTITUDE

(75) Inventor: David L. Hall, Salt Lake City, UT (US)

(73) Assignee: Iomega Corporation, San Diego, CA (US)

( * ) Notice: Subject to any disclaimer, the term of this patent is extended or adjusted under 35 U.S.C. 154(b) by 785 days.

(21) Appl. No.: 09/903,113

(22) Filed: Jul. 11, 2001

(65) Prior Publication Data

US 2003/0011931 A1 Jan. 16, 2003

(51) Int. Cl.$^7$ .................... G11B 5/127; G11B 5/60; G11B 17/32
(52) U.S. Cl. ..................................... 360/234.2
(58) Field of Search ................. 360/234.2, 99.01, 360/236.6, 237.1

(56) References Cited

U.S. PATENT DOCUMENTS

| | | | | |
|---|---|---|---|---|
| 4,912,582 A | * | 3/1990 | Gomi et al. ............. | 360/99.01 |
| 4,928,196 A | * | 5/1990 | Hickok et al. ........... | 360/246.8 |
| 4,974,106 A | * | 11/1990 | White et al. ............. | 360/234.2 |
| 5,189,574 A | * | 2/1993 | Imamura et al. ......... | 360/234.2 |
| 5,235,483 A | * | 8/1993 | Hayakawa et al. ...... | 360/246.2 |
| 5,473,488 A | * | 12/1995 | Gustafson et al. ....... | 360/245.5 |
| 5,537,269 A | * | 7/1996 | Zarouri .................... | 360/97.01 |
| 5,570,261 A | * | 10/1996 | Frater et al. ............. | 360/244.3 |
| 5,636,085 A | * | 6/1997 | Jones et al. .............. | 360/236.6 |
| 5,650,891 A | | 7/1997 | Thayne et al. ........... | 360/99.06 |
| 5,969,904 A | * | 10/1999 | Alt et al. .................. | 360/245.4 |
| 6,021,021 A | * | 2/2000 | Alt et al. .................. | 360/245.7 |
| 6,023,393 A | * | 2/2000 | White ...................... | 360/234.2 |
| 6,084,748 A | * | 7/2000 | Ito et al. .................. | 360/246.1 |
| 6,115,219 A | * | 9/2000 | Hall ......................... | 360/234.2 |
| 6,388,839 B2 | * | 5/2002 | Souda et al. ............. | 360/236.9 |
| 6,583,959 B1 | * | 6/2003 | Hall ......................... | 360/234.2 |

FOREIGN PATENT DOCUMENTS

| | | | | | |
|---|---|---|---|---|---|
| JP | 60109073 A | * | 6/1985 | ........... | G11B/21/21 |
| JP | 61057087 A | * | 3/1986 | ........... | G11B/21/21 |
| JP | 61273784 A | * | 12/1986 | ........... | G11B/21/21 |
| JP | 63298879 A | * | 12/1988 | ........... | G11B/21/21 |

OTHER PUBLICATIONS

Chhabra, D.S. et al. "Air Bearing Design Considerations for Constant Fly Height Applications." IEEE Transactions on Magnetics. vol. 30. No. 2. Mar. 1994, pp. 417–423.*

* cited by examiner

Primary Examiner—William Korzuch
Assistant Examiner—Christopher R. Magee
(74) Attorney, Agent, or Firm—James T. Hagler

(57) ABSTRACT

A head stack assembly is provided for interfacing with a flexible medium of a disk. The head stack assembly includes a first head and a second head located substantially adjacent to the first head wherein the flexible medium may be disposed between the first head and the second head. The first head and the second head are substantially parallel to each other and disposed at a static roll angle θa and a static roll angle θb, respectively, from the flexible medium to impart a curvature to the flexible medium of a disk. The curvature reduces out-of-plane vibrations of the flexible medium and thereby enhances the electrical communicative signal between the flexible medium and the first and the second heads.

10 Claims, 7 Drawing Sheets

SYSTEM AND METHOD OF INTRODUCING A PREFERENTIAL CURVATURE TO A FLEXIBLE MEDIUM FOR REDUCED MEDIUM VIBRATION AND SENSOR TO MEDIUM SPACING WITH A DISK DRIVE HEAD STACK ASSEMBLY HAVING A NON-ZERO STATIC ROLL ATTITUDE

FIELD OF THE INVENTION

The present invention generally relates to the field of flexible medium disk drives, more particularly, the present invention relates to a disk drive head gimbal assembly with a flexure roll that imparts a curvature in a flexible medium, thereby reducing out-of-plane vibration of the flexible medium in the region near a sensor and providing enhanced electrical communication between the flexible medium and the disk drive.

BACKGROUND OF THE INVENTION

In a typical flexible medium disk drive system, the flexible medium of the disk has signals magnetically encoded on the flexible medium. The disk rotates and a disk drive sensor senses the magnetic signals as the flexible medium rotates past the disk drive sensor. The disk drive sensor converts the magnetic signals to electrical signals for use by other systems.

The magnetic signal levels of the disk decrease substantially exponentially with the distance from the flexible medium of the disk. Therefore, it is desired to place the disk drive sensor as close as possible to the flexible medium. Additionally, the speed of current disk drives causes the flexible medium to vibrate out-of-plane, which in turn, may decrease the accuracy of the communication between the flexible medium and the disk drive. Therefore, it is desired to reduce vibration of the flexible medium in the region near the disk drive sensor.

A typical disk drive system includes a head head stack assembly including two head gimbal assemblies positioned such that their heads face each other and are placed on opposite sides of the flexible medium. The heads include sensors for sensing the magnetic signals of the flexible medium. A force is applied to the two heads, sandwiching the flexible medium between the two heads. The sandwiching of the flexible medium between the two heads decreases the out-of-plane vibration of the flexible medium in the region of the heads, resulting in increased accuracy of communication between the flexible medium and the disk drive. Generally, increasing the force will reduce the out-of-plane vibration of the flexible medium and increase the accuracy of the communication.

However, increasing the force too much may adversely affect the system by increasing the wear of the flexible medium and/or the heads. To further explain, a rotating disk in conjunction with the heads creates an area of increased air pressure near the surface of the disk and beneath the heads that pushes the head gimbal assembly slightly away from the surface of the flexible medium. This phenomena causes portions of the heads to "fly" slightly above the surface of the flexible medium.

Because portions of the heads are "flying" above the surface of the flexible medium, the head gimbal assembly does not significantly wear the flexible medium. However, because portions of the heads are flying above the surface of the flexible medium, the flexible medium is allowed to vibrate, albeit less than if the flexible medium were not sandwiched between the two heads of the head stack assembly.

Therefore, if the forces pushing the heads of the head stack assembly together are increased significantly, the disk drive heads may rub against the flexible medium with a relatively large force, which in turn may increase the wear of the flexible medium and/or the head. Thus, simply increasing the forces pushing the heads together is of limited value in further reducing out-of-plane vibration of the flexible medium. Conventional techniques disclose keeping the disk drive heads as parallel as possible to the flexible medium and selecting a force that minimizes both vibration and wear.

In view of the above problems, there is a recognized need for a system and method of reducing flexible medium out-of-plane vibration to increase the accuracy and speed of a disk drive. The present invention satisfies this need.

SUMMARY OF THE PRESENT INVENTION

The present invention is directed to a disk drive head gimbal assembly with a flexure roll that imparts a curvature in a flexible medium, thereby reducing out-of-plane vibration of the flexible medium in the region near a sensor and providing enhanced electrical communication between the flexible medium and the disk drive.

According to an aspect of the present invention, a head stack assembly is provided for interfacing with a flexible medium of a disk. The head stack assembly includes a first head and a second head located substantially adjacent to the first head wherein the flexible medium may be disposed between the first head and the second head. The first head and the second head are substantially parallel to each other and disposed at an angle θa and an angle θb, respectively, from the plane of the flexible medium.

According to another aspect of the present invention, the head stack assembly includes a first head gimbal assembly and a second head gimbal assembly. Each head gimbal assembly includes a load beam, a flexure member coupled to the load beam, and a head coupled to the flexure member. The flexure member has a static roll angle θa from the plane of the flexible medium.

According to another aspect of the present invention, a method is provided for reducing out-of-plane vibration in a flexible medium in a region near a sensor of a head stack assembly having a first and second head. The flexible medium is placed between the first and second head. The first and second heads are angled such that the first and second head remain parallel but offset from the flexible medium, thereby imparting a curvature in the flexible medium, and enhancing the communicative signal between the flexible medium and the head stack assembly.

These and further aspects of the present invention will be more fully discussed herein.

BRIEF DESCRIPTION OF THE DRAWINGS

The present invention is further described in the detailed description that follows, by reference to the noted plurality of drawings by way of non-limiting illustrative embodiments of the present invention, in which like reference numerals represent similar parts throughout the several views of the drawings, and wherein.

DETAILED DESCRIPTION OF THE ILLUSTRATIVE EMBODIMENTS

Figure 1:
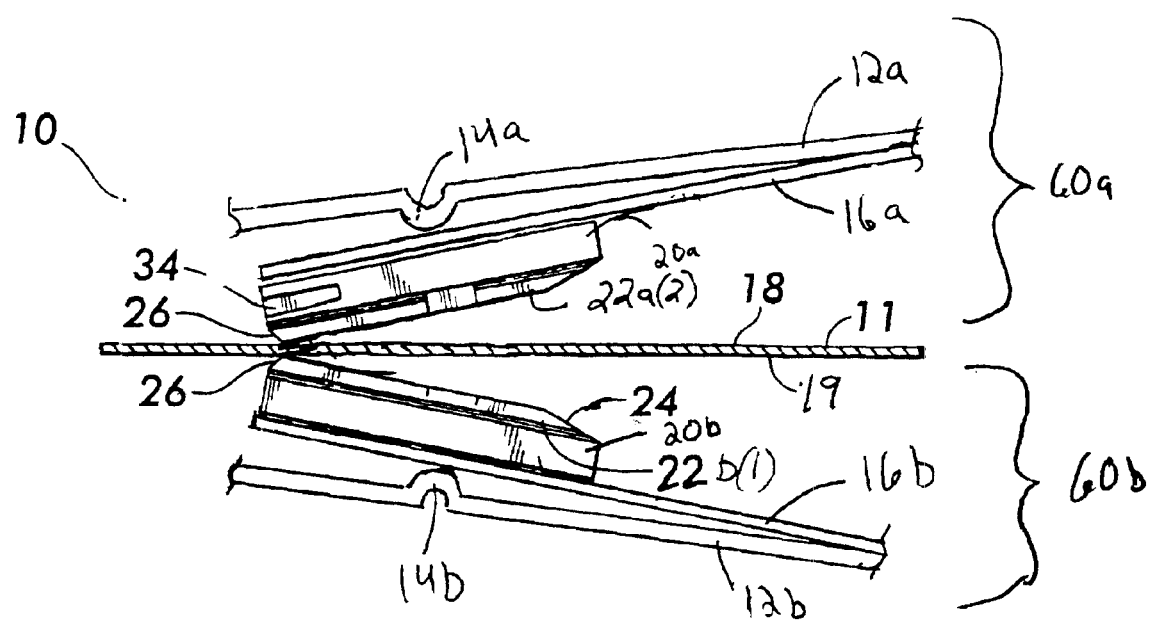
FIG. 1 is a side view of a head stack assembly and a flexible medium having rotation from right to left, in accordance with one embodiment of the present invention.

The present invention is directed to a disk drive head stack assembly with head gimbal assemblies each utilizing suspension assemblies with static roll angles that impart a curvature in a flexible medium, thereby reducing out-of-plane vibration of the flexible medium in the region near sensors of the head stack assembly and providing enhanced electrical communication between the flexible medium and the disk drive.

Certain terminology may be used in the following description for convenience only and is not considered to be limiting. For example, the words "left", "right", "top", and "bottom" designate directions in the drawings to which reference is made. Likewise, the words "inwardly" and "outwardly" are directions toward and away from, respectively, the geometric center of the referenced object. The terminology includes the words above specifically mentioned, derivatives thereof, and words of similar import.

The head stack assembly of the present invention may be employed with a flexible medium, such as the flexible magnetic medium utilized in the ZIP®100 disk cartridge, the ZIP®250 disk cartridge, the POCKETZIP®40 disk cartridge, or the POCKETZIP®100 disk cartridge (Iomega Corporation, Roy, Utah). Additionally, with the development of storage media capable of greater densities, improved read/writing devices are needed. In the embodiments described below, the head stack assembly is described as a head stack assembly that is employed with magnetic storage medium. However, it should be understood that the head stack assembly of the present invention can be employed with any flexible medium.

The present invention may be employed with a variety of disk drives, including but not limited to a stand alone disk drive, a personal computer disk drive, a portable personal computer disk drive, such as in a laptop computer disk drive or a notebook type of computer disk drive, a scanner disk drive, a camera disk drive, a hand held type of computer disk drive, a digital audio player, and the like.

By way of background, the disk drive with which the head stack assembly of this invention may be employed may have a disk drive motor for operating the disk cartridge, such as, but not limited to, the disk drive as shown in U.S. Pat. No. 5,650,891. In this type of disk drive, the disk drive motor is a spindle motor that is disposed in the chassis of the disk drive. When the disk cartridge is inserted into the disk drive, the disk drive motor engages a hub of the disk cartridge. When engaged with the hub of the disk cartridge, the disk drive motor is operated by a microprocessor to rotate the hub and the attached flexible medium. The head stack assembly of the present invention is also referred to as the actuator within a disk drive.

Neither the disk drive nor the disk cartridge described above are part of this invention. However, they may be used in combination with head stack assembly 10 of this invention, which is described in detail below.

As shown in FIG. 1, head stack assembly 10 includes a first head gimbal assembly 60a and a second head gimbal assembly 60b. First head gimbal assembly 60a includes a first head 20a, a first flexure member 16a, and a first load beam 12a. Second head gimbal assembly 60b includes a second head 20b, a second flexure member 16b, and a second load beam 12b. The following discussion of first head gimbal assembly also applies to second head gimbal assembly 60b.

Head 20a is coupled to flexure member 16a at a distal end of flexure member 16a. In the present embodiment, head 20a is coupled to flexure member 16a with an adhesive; however, any coupling method may be used, such as, fastening, welding, and the like.

Figure 4:
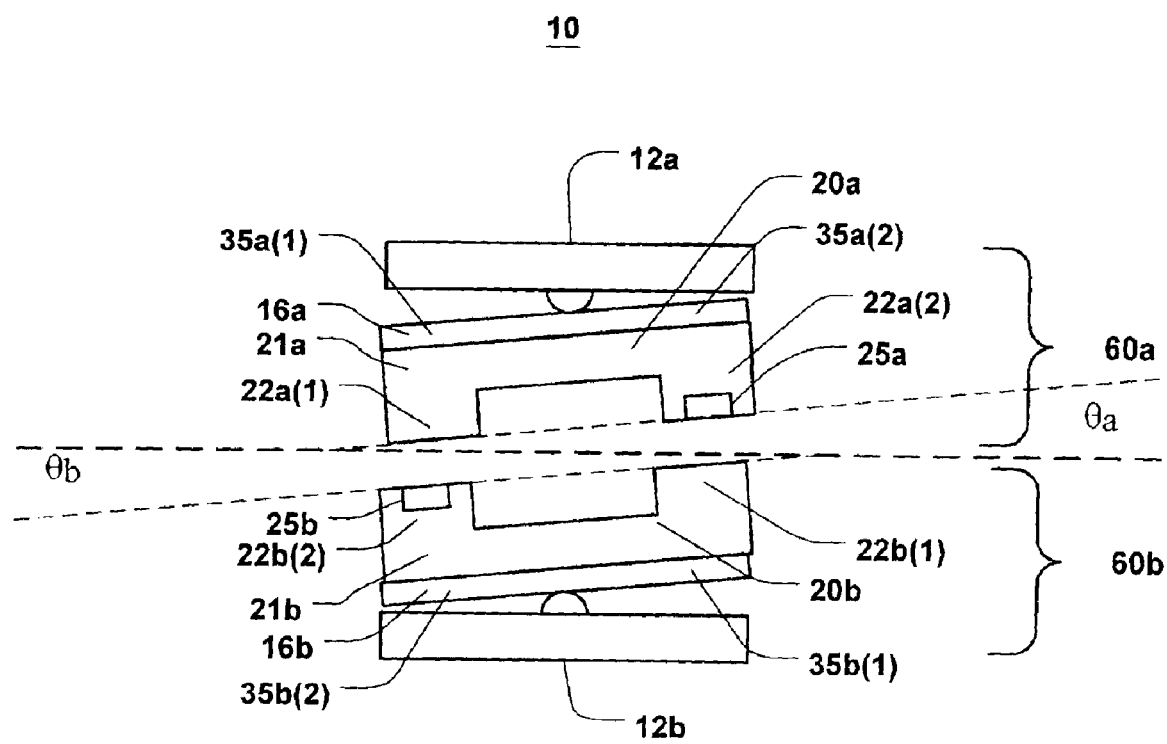
FIG. 4 is a rear view of the head stack assembly of FIG. 1, in accordance with one embodiment of the present invention.

A proximal end of flexure member 16a is coupled to a proximal end of load beam 12a. In the present embodiment, flexure member 16a is coupled to load beam 12a with welds; however, any coupling method may be used, such as for example, fastening, and the like. Load beam 12a includes a dimple 14a that is spring loaded against flexure member 16a. Dimple 14a allows flexure member 16a to change the static roll angle of flexure member 16a, as best shown in FIG. 4 and described in more detail below. Static roll angle is defined herein as the angle of the head relative to the plane of the flexible media along a radial line of the plane of the flexible medium, with no flexible medium located between the heads and no force acting to compress the heads together (i.e., no gram loading of the heads thereby, the heads being spaced apart rather than coupled together).

Flexible medium 11 may be disposed between first head 20a and second head 20b, as shown in FIG. 1. Particularly, first head 20a may be disposed proximal to first surface 18 of flexible medium 11, and second head 20b may be disposed proximal to second surface 19 of flexible medium 11. As shown, first head 20a is disposed above the flexible medium and second head 20b is disposed beneath the flexible medium; however, the invention is not so limited. First head 20a and second head 20b must be disposed on opposing sides of the flexible medium and adjacent to each other.

Figure 2:
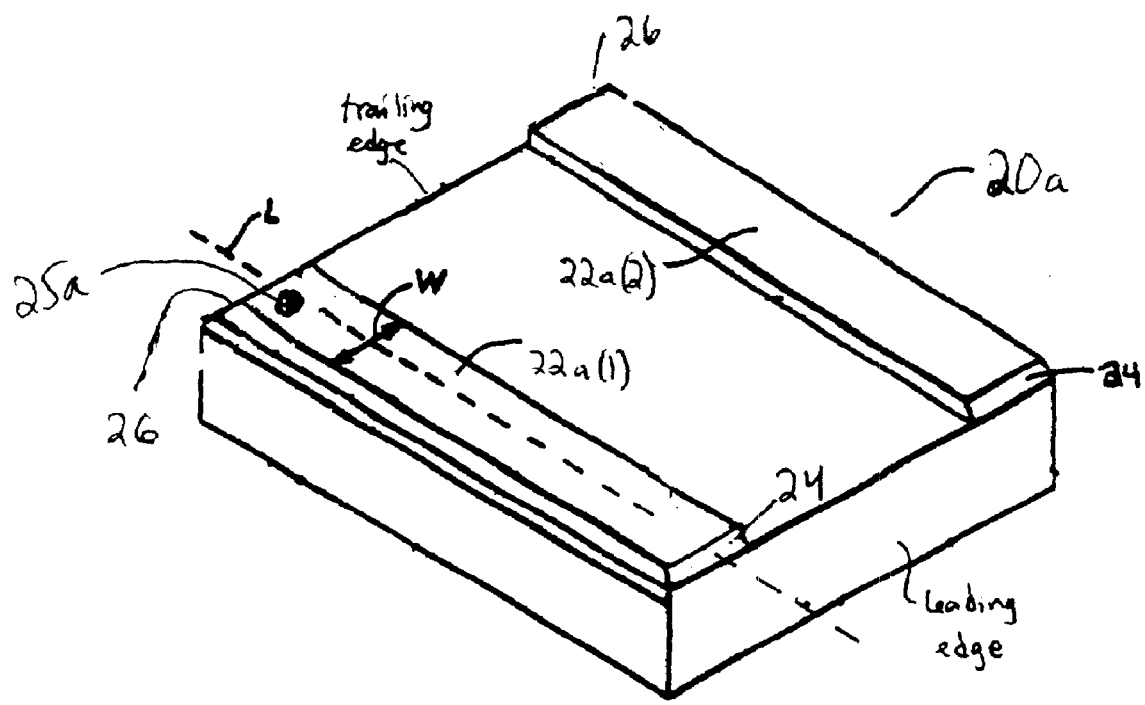
FIG. 2 is a bottom view of a portion of the head stack assembly of FIG. 1.

Both first head 20a and second head 20b have a pair of longitudinal rails 22 (including longitudinal rails 22a(1), 22a(2), 22b(1), and 22b(2)), as best seen in FIG. 2. Although only first head 20a is shown in FIG. 2, it will be appreciated that second head 20b is typically identical to first head 20a. The following discussion of first head 20a applies to second head 20b. Longitudinal rails 22 of head 20a may extend the length of head 20a. Each of rails 22 has a first longitudinal end 24 and a second longitudinal end 26. In one embodiment, both first longitudinal end 24 and second longitudinal end 26 of rails 22 are beveled; however, they need not be beveled. First longitudinal end 24 of each of rails 22 may be the leading edge of rails 22, and second longitudinal end 26 of each of rails 22 may be the trailing edge of each of rails 22. The trailing edge is that which trails the direction of motion of the head relative to the flexible medium, and the leading edge is that which leads the direction of motion of the head relative to the flexible medium.

One of rails 22 of head 20a has a sensor 25a for electrically communicating with a disk drive and/or a microprocessor. Similarly, one of rails 22 of head 20b has a sensor 25b, as is best seen in FIG. 4.

When assembled to flexure member 16a, as shown in FIG. 1, first head 20a is disposed above second head 20b. Preferably, the heads are gram-loaded towards each other when assembled in the head stack assembly.

Figure 3:
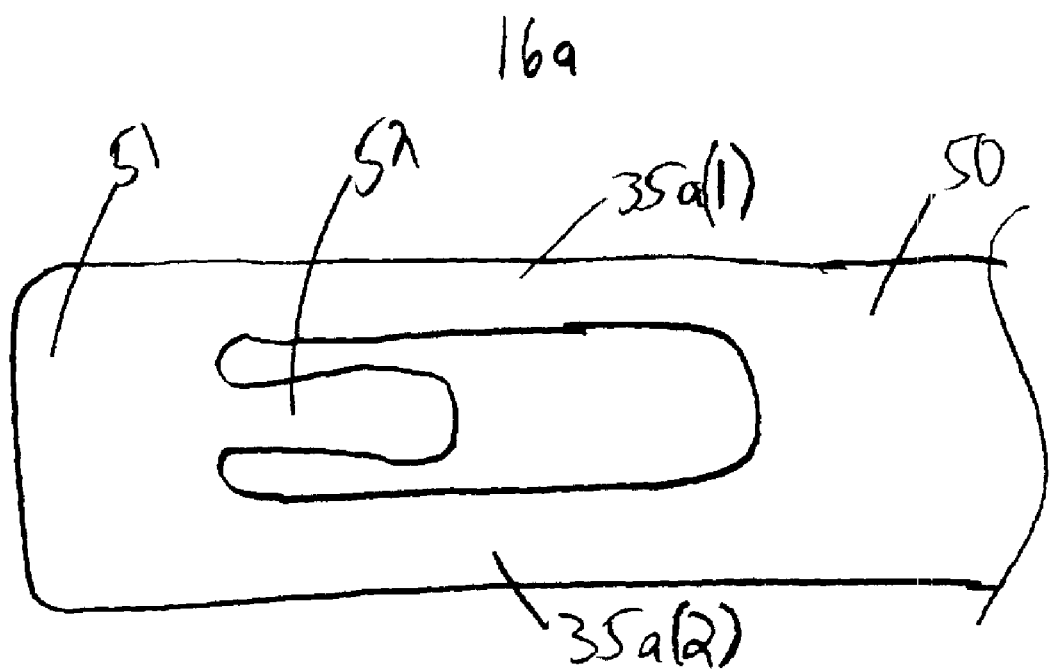
FIG. 3 is a top view of a portion of the head stack assembly of FIG. 1.

FIG. 3 is a top view of flexure member 16a. As shown, flexure member 16a includes a proximal end 50 and a distal end 51. Proximal end 50 and distal end 51 are connected via a first force member 35a(1) and a second force member 35a(2). First force member 35a(1) and second force member 35a(2) may be configured to provide a static roll angle to head 20a. For example, distal end 51 is angled with respect to proximal end 50 to form a static roll angle. Also, first force member 35a(1) and second force member 35a(2) may be configured to provide resistance to flexing. These parameters are determined by the material, thickness, and length of flexure member 16a. Flexure member 16a also includes a tongue section 52 for mounting of head 20a.

Figure 5:
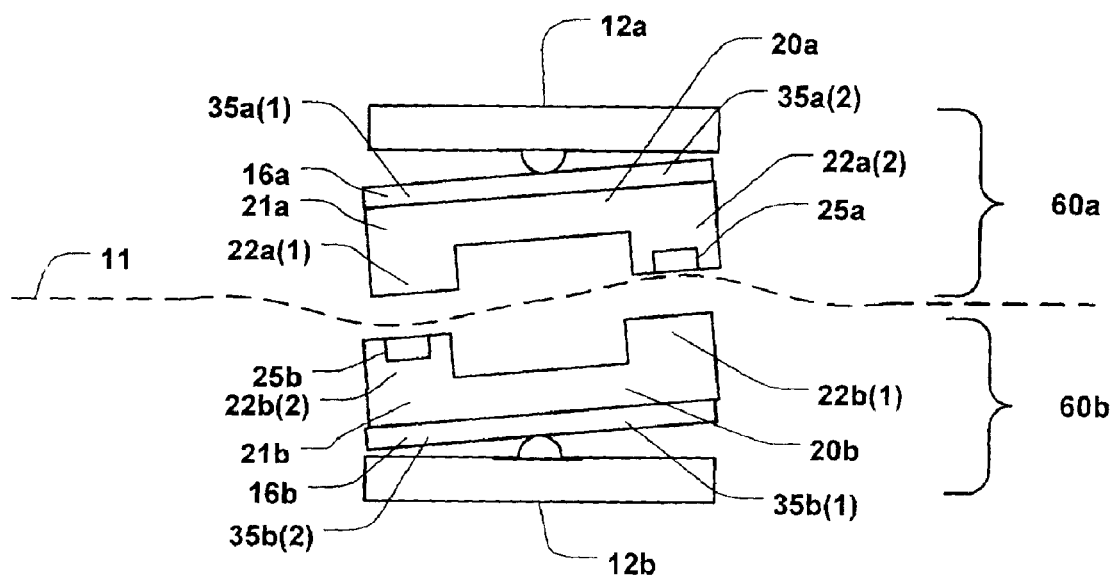
FIG. 5 a rear view of the head stack assembly of FIG. 1 and a flexible medium having a rotation out of FIG. 5, illustrating imparted curvature of the flexible medium of a disk cartridge, in accordance with the embodiment of the present invention illustrated in FIG. 4.

FIGS. 4 and 5 depict the operation of head stack assembly 10 of the present invention. As shown, in the interfacing position, flexible medium 11 of the disk drive is disposed between first head 20a and second head 20b. In operation, flexible medium 11 is rotated by a disk drive spindle motor, or the like. The direction of rotation of flexible medium 11 is into leading edges 24 of heads 20a, 20b, as is best seen in FIG. 1.

As is generally understood, heads 20a, 20b are preloaded or gram-loaded with a force towards the flexible medium. The gram-loading causes biasing of heads 20a, 20b towards the flexible medium.

When the flexible medium is rotated, the medium wrinkles and vibrates out-of-plane. Importantly, by imparting a curvature in the flexible medium with heads 20a, 20b, out-of-plane vibrations may be reduced in the region of the flexible medium near a sensor, as described in more detail below. This reduction in vibration enhances the communication between the flexible medium and sensors 25a, 25b of head stack assembly 10.

As shown in FIG. 4, first gimbal assembly 60a includes head 20a, flexure member 16a, and load beam 12a. Head 20a includes a body 21a, first rail 22a(1), second rail 22a(2), and sensor 25a. It should be appreciated that second head 20b is substantially similar to first head 20a and the following discussion applies to second head 20b.

Body 21a is substantially rectangular, however, body 21a may be any shape. First rail 22a(1) and second rail 22a(2) may extend the length of head 20a as discussed above. Second rail 22a(2) includes sensor 25a for communicating with flexible medium 11.

First force member 35a(1) is coupled between load beam 12a and head 20a proximate to first rail 22a(1). Second force member 35a(2) is coupled between load beam 12a and head 20a proximate to second rail 22a(2). Force members 35 may be leaf springs or any other force member capable of applying a force between load beam 12a and head 20a.

In a similar manner, second head 20b is coupled to load beam 12b. Again, in a similar manner, first force member 35b(1) is coupled between load beam 12b and head 20b proximate to first rail 22b(1). Second force member 35b(2) is coupled between load beam 12b and head 20b proximate to second rail 22b(2).

Rail 22a(2) having sensor 25a of first head 20a is disposed above and adjacent to rail 22b(1) of second head 20b that does not have a sensor, as shown in FIG. 4. Similarly, rail 22b(2) of second head 20b having sensor 25b is disposed beneath and adjacent to rail 22a(1) of first head 20a that does not have a sensor.

In first head gimbal assembly 60a, first force member 35a(1) is offset from the plane of the flexible medium by an angle of θa. In second head gimbal assembly 60b, first force member 35b(1) is offset from the plane of the flexible medium by an angle of θb (i.e., a static roll angle). In this manner, first and second head 20a, 20b remain substantially parallel to each other, but are offset slightly from each other.

When the flexible medium is rotated through the first and second heads, the flexible medium deflects in a ripple or wave shape since it is deflecting both upward and downward at different points, as shown in FIG. 5. The imparted curvature reduces out-of-plane vibration of the flexible medium in the region near sensors 25a, 25b.

For example, a rotating flexible medium can vibrate with out-of-plane displacements of 400,000 nm. Disposing the flexible medium between two heads can reduce out-of-plane displacements to within the range of about 40 nm to about 60 nm in the region near the sensors. It has been shown that the present invention may reduce out-of-plane displacements an additional about 5 nm to about 10 nm in the region near the sensors.

Moreover, as illustrated in FIG. 5, the sensor is placed near the convex side of the curvature of flexible medium 11 to minimize the distance between flexible medium 11 and sensors 25a, 25b, further enhancing electrical communication between flexible medium 11 and sensors 25a, 25b of the head stack assembly.

In one embodiment, static roll angle θa and static roll angle θb are substantially the same and are from about 1 degree to about 2.5 degrees. In another embodiment, static roll angle θa and static roll angle θb are both about 2 degrees. It will be appreciated that the static roll angles disclosed are the angles with no flexible medium located between heads 20 and with the heads unloaded. With a rotating flexible medium located between the heads it is no longer a static roll, but rather a dynamic roll and the dynamic angles are usually smaller than the static angles. The actual dynamic angles will depend on which portion of the flexible medium the heads are near. For example, it is expected that with a rotating flexible medium, the actual angle will be smaller towards the center of the medium, as the medium is more rigid towards the center. Also, the actual angle will depend on the thickness of the flexible medium, the rotational speed of the flexible medium, the thickness of the flexure member, as well as other factors.

Figure 6:
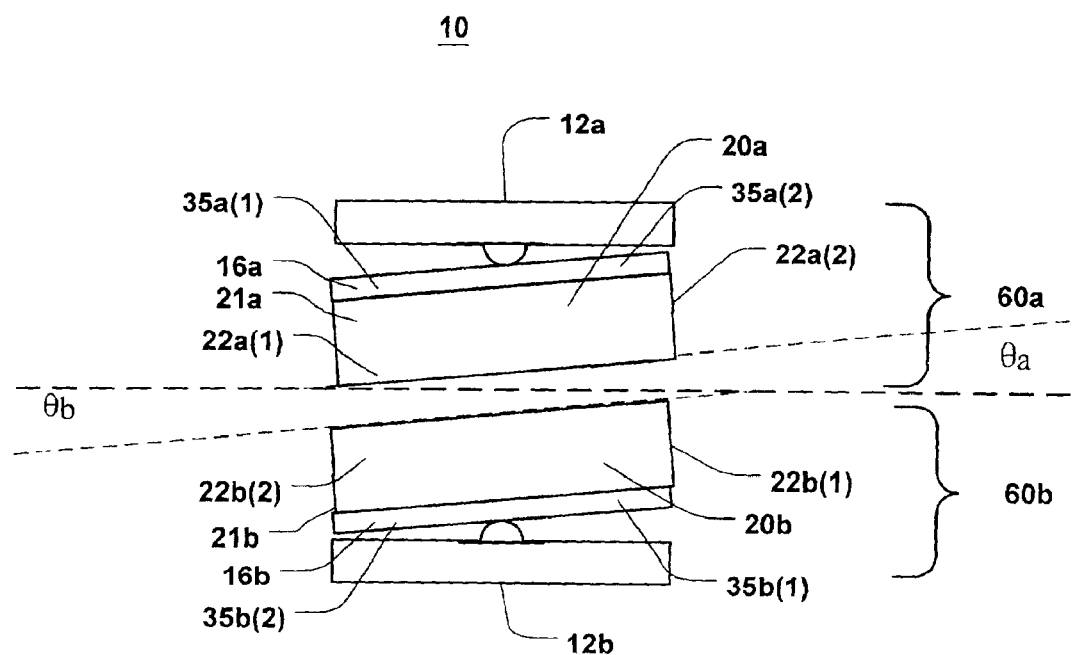
FIG. 6 is a rear view of a head stack assembly, in accordance with another embodiment of the present invention.

FIG. 6 is a rear view of a head stack assembly in accordance with another embodiment of the present invention. As shown in FIG. 6, first head gimbal assembly 60a includes head 20a, load beam 12a, first force member 35a(1) and second force member 35a(2). Head 20a includes body 21a. It should be appreciated that second head assembly 60b is substantially similar to first head assembly 20a and the following discussion applies to second head assembly 60b.

First force member 5a(1) is coupled between load beam 12a and the first side of body 21a. Second force member 35a(2) is coupled between load beam 12a and the second side of body 21a. Force members 35 may be leaf springs or any other force member capable of applying a force between load beam 12a and head 20a.

In a similar manner, second head 20b is coupled to load beam 12b. Again, in a similar manner, first force member 35b(1) is coupled between load beam 12b and the first side of body 21b. Second force member 35b(2) is coupled between load beam 12b and second side of body 21b.

In first head gimbal assembly 60a, first force member 35a(1) is offset from the plane of the flexible medium by a static roll angle of θa. In second head gimbal assembly 60b, first force member 35b(1) is offset from the plane of the flexible medium by a static roll angle of θb. In this manner, first and second head 20a, 20b remain substantially parallel to each other, but are offset slightly from each other.

Figure 7:
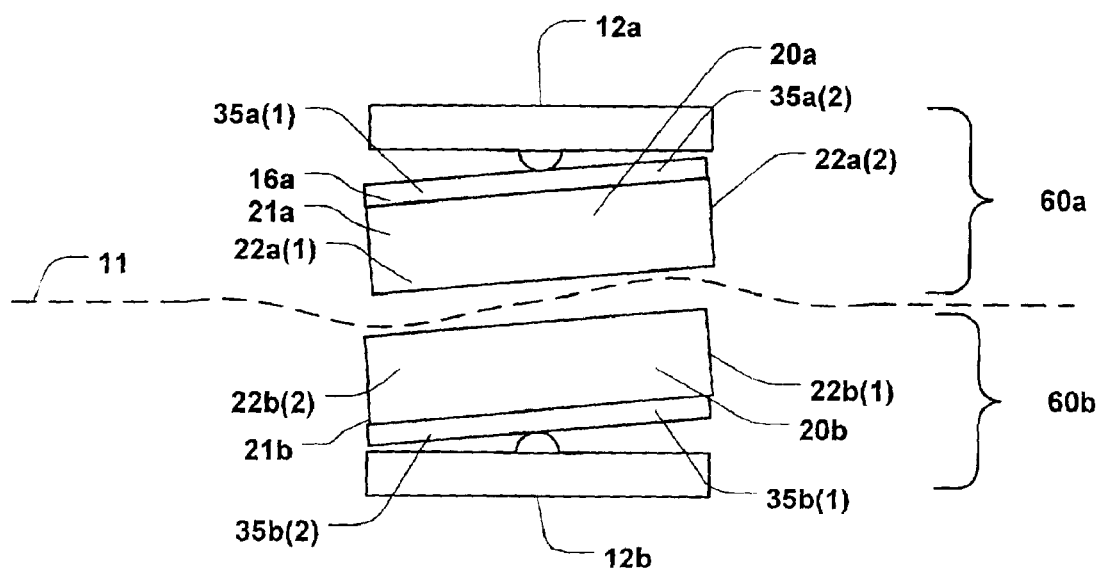
FIG. 7 a rear view of the head stack assembly and a flexible medium having a rotation out of FIG. 7, illustrating imparted curvature of the flexible medium of a disk cartridge, in accordance with the embodiment of the present invention illustrated in FIG. 6.

When the flexible medium is rotated through the first and second heads, the flexible medium deflects in a ripple or wave shape since it is deflecting both upward and downward at different points, as shown in FIG. 7. The imparted curvature reduces out-of-plane vibration of the flexible medium in the region near sensors 25a, 25b.

The present invention may be employed with heads of a variety of sizes, including but not limited to, standard, micro, nano, and pico heads.

As is generally understood, the voltage or strength of the electrical signal between the head and the flexible medium is dependent upon the spacing between the medium and the sensor. Moreover, the accuracy of the electrical communication between the flexible medium and a disk drive depends upon constant and proximate spacing between the sensor of the head gimbal assembly and the flexible medium. Therefore, any vibration of the flexible medium in the region near the sensor is adverse to communication between the sensor and the flexible medium. For sinusoidal magnetic playback, the strength of the signal decreases in an exponential relationship with the spacing between the medium and the sensor. Thus, with the flexible medium having reduced out-of-plane vibration in the region near the sensor, electrical communication between the sensor and the flexible medium may be enhanced. This is particularly important for magnetic heads that must interface with improved magnetic medium that is capable of a relatively high density and more storage capacity. As described in further detail below, the head stack assembly of the present invention enhances electrical communication with data storage medium such as the medium employed in the ZIP®100 disk cartridge, the ZIP®250 disk cartridge, the POCKETZIP®40 disk cartridge, or the POCKETZIP®100 disk cartridge.

It is desired to increase the speed of rotation of the flexible medium to increase the data transmission rate between the medium and the sensor. However, high rotational rates generally result in larger vibrations of the medium. The present invention permits increased speeds of rotation of the medium by providing reduced out-of-plane vibration of the flexible medium allowing the sensor to remain in communication with the medium at higher speeds and thereby permit higher data transmission rates.

It is noted that the foregoing examples have been provided merely for the purpose of explanation and are in no way to be construed as limiting of the present invention. While the invention has been described with reference to exemplary embodiments, it is understood that the words which have been used herein are words of description and illustration, rather than words of limitations. Further, although the invention has been described herein with reference to particular structures, methods, materials, and embodiments, the invention is not intended to be limited to the particulars disclosed herein; rather, the invention extends to all structures, methods and uses that are within the scope of the appended claims. Those skilled in the art, having the benefit of the teachings of this specification, may effect numerous modifications thereto and changes may be made without departing from the scope and spirit of the invention, as defined by the appended claims.

What is claimed is:

1. A head stack assembly for interfacing with a flexible medium of a disk, comprising: a first head; a second head located substantially adjacent to the first head wherein the flexible medium may be disposed between the first head and the second head; the first head and the second head substantially parallel to each other and disposed at non-zero static roll angles θa and θb, respectively from the plane of the flexible medium.

2. The head stack assembly of claim 1 wherein the static roll angle θa and the static roll angle θb are from about 1 degree to about 2.5 degrees.

3. The head stack assembly of claim 1 wherein the static roll angle θa and the static roll angle θb are both about 2 degrees.

4. The head stack assembly of claim 1 wherein the static rolls angles of the first and second heads impart a curvature in the flexible medium.

5. The head stack assembly of claim 4 wherein the curvature in the medium reduces out-of-plane vibrations in the flexible medium in the region of the flexible medium proximate to the heads.

6. The head stack assembly of claim 1 wherein each head further comprises a sensor, the sensor of the first head located distal from the sensor of the second head.

7. The head stack assembly of claim 1 wherein each head has a top and a bottom and each head further comprises a first and second rail, the first and second rail extending the length of the bottom of each head.

8. A method of reducing out-of-plane vibration in a flexible medium in a region near a head slack assembly having a first and second head, comprising: angling the first and second heads such that the first and second head remain substantially parallel but offset from the plane of the flexible medium by non-zero static roll angles of θa and θb, respectively, thereby imparting a curvature in the flexible medium, and enhancing the communicative signal between the flexible medium and the head stack assembly.

9. The method of claim 8 wherein the static roll angles θa and θb are from about 1 degree to about 2.5 degrees.

10. The method of claim 8 wherein the static roll angles θa and θb are both about 2 degrees.

* * * * *